(12) United States Patent
Dyche, Jr.

(10) Patent No.: US 11,853,831 B2
(45) Date of Patent: Dec. 26, 2023

(54) SMALL FOOTPRINT HIGH PERFORMING PASSIVE RFID TAG

(71) Applicant: AVERY DENNISON RETAIL INFORMATION SERVICES, LLC, Mentor, OH (US)

(72) Inventor: George L. Dyche, Jr., Mason, OH (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 16/443,478

(22) Filed: Jun. 17, 2019

(65) Prior Publication Data

US 2019/0385039 A1    Dec. 19, 2019

Related U.S. Application Data

(60) Provisional application No. 62/686,241, filed on Jun. 18, 2018.

(51) Int. Cl.
*G06K 19/077* (2006.01)
*G06K 19/07* (2006.01)
*G06K 19/073* (2006.01)

(52) U.S. Cl.
CPC ... *G06K 19/07786* (2013.01); *G06K 19/0723* (2013.01); *G06K 19/07327* (2013.01)

(58) Field of Classification Search
CPC .............................. G06K 19/00; G06K 19/06
USPC ................................................ 235/487, 375
See application file for complete search history.

(56) References Cited

U.S. PATENT DOCUMENTS

| 6,321,067 | B1 | 11/2001 | Suga et al. |
| 8,356,757 | B2 | 1/2013 | Sonoda et al. |
| 9,178,731 | B2 | 11/2015 | Manku |
| 2006/0066444 | A1* | 3/2006 | Steeves ............. G06K 7/10108 340/10.5 |
| 2006/0087301 | A1 | 4/2006 | Pardoen et al. |
| 2008/0153450 | A1* | 6/2008 | Atsumi ............. G06K 19/0702 455/337 |
| 2008/0191951 | A1 | 8/2008 | Kato |
| 2009/0033467 | A1* | 2/2009 | Finocchiaro ............. H04B 5/00 340/10.1 |
| 2009/0273454 | A1 | 11/2009 | Onozuka et al. |

(Continued)

FOREIGN PATENT DOCUMENTS

| CN | 1178407 | | 4/1998 | |
| CN | 1898683 A | * | 1/2007 | ....... G06K 19/07749 |

(Continued)

OTHER PUBLICATIONS

International Search Report and Written Opinion dated Sep. 17, 2019 issued in corresponding IA No. PCT/US2019/037506 filed Jun. 17, 2019.

(Continued)

*Primary Examiner* — Edwyn Labaze

(57) ABSTRACT

The present invention is in the field of ultra-high frequency ("UHF") radio frequency identification ("RFID") tags. More particularly, the present invention relates generally to systems and methods for providing a passive UHF RFID tag having a small footprint that is optimized for high performance applications in emerging markets for RFID technology.

18 Claims, 7 Drawing Sheets

(56) References Cited

U.S. PATENT DOCUMENTS

| | | | |
|---|---|---|---|
| 2010/0066325 A1* | 3/2010 | Shionoiri | G06K 19/0701 323/282 |
| 2012/0208459 A1* | 8/2012 | Burtt | H04B 5/0031 455/41.1 |
| 2013/0343107 A1* | 12/2013 | Perreault | H03F 3/211 363/67 |
| 2015/0098528 A1* | 4/2015 | Nowottnick | H04B 5/0068 375/320 |
| 2016/0285449 A1* | 9/2016 | Yoo | H03K 17/693 |
| 2017/0310513 A1 | 10/2017 | Manku | |
| 2018/0165569 A1* | 6/2018 | Kune | G06K 19/0715 |
| 2018/0182217 A1* | 6/2018 | Lamothe | G06K 19/0724 |

FOREIGN PATENT DOCUMENTS

| | | | | |
|---|---|---|---|---|
| CN | 102112998 | | 6/2011 | |
| CN | 102195612 A | * | 9/2011 | H03H 11/1291 |
| CN | 102217135 A | * | 10/2011 | H01Q 1/2208 |
| CN | 1795585 B | * | 2/2012 | G06K 19/07749 |
| CN | 103137326 A | * | 6/2013 | |
| CN | 107111772 | | 8/2017 | |
| EP | 0829940 | | 3/1998 | |
| EP | 1645994 | | 4/2006 | |
| EP | 2330538 | | 6/2011 | |
| JP | 10-145987 | | 5/1998 | |
| JP | 2008218989 A | * | 9/2008 | G06K 19/0723 |
| JP | 2009-272697 | | 11/2009 | |
| JP | 2011-028424 | | 2/2011 | |
| JP | 2014-135012 | | 7/2014 | |

OTHER PUBLICATIONS

International Preliminary Report on Patentability dated Dec. 22, 2020 issued in corresponding IA No. PCT/US2019/037506 filed Jun. 17, 2019.

* cited by examiner

SMALL FOOTPRINT HIGH PERFORMING PASSIVE RFID TAG

CROSS REFERENCE TO RELATED APPLICATION(S)

The present application claims priority from U.S. Provisional Application No. 62/686,241 filed Jun. 18, 2018, which is incorporated by herein by reference in its entirety.

FIELD OF THE INVENTION

The present invention is in the field of ultra-high frequency ("UHF") radio frequency identification ("RFID") tags. More particularly, the present invention relates generally to systems and methods for providing a passive UHF RFID tag having a small footprint that is optimized for high performance applications in emerging markets for RFID technology.

BACKGROUND OF THE INVENTION

RFID uses magnetic, electric, or electromagnetic fields transmitted by a reader system to identify itself and, in some cases, provide additionally stored data. RFID tags typically include a semiconductor device commonly called the "chip" or "integrated circuit", on which are formed a memory and operating circuitry. The integrated circuit is connected to a tag antenna, either directly or with a device such as an interposer or RFID strap device, as is known in the art. Typically, RFID tags act as transponders, providing information stored in the integrated circuit memory in response to a radio frequency ("RF") interrogation signal received from an RFID reader, also referred to as an interrogator. In the case of active RFID devices, the device has a power source such as a battery. With passive RFID devices, on the other hand, the energy of the interrogation signal also provides the necessary energy to operate the RFID device. Thus, although passive RFID devices may have a shorter read range compared to active RFID devices, they are much less expensive and do not have a limited life time (e.g., due to limits on battery life) as with active RFID devices. In addition, because passive RFID devices do not have an on-board power source, passive RFID devices are typically smaller than active RFID devices.

Throughout the world, RFID systems operate in low frequency ("LF"), high frequency ("HF"), or ultra-high frequency ("UHF") bands. Because radio waves behave differently in each of these frequency bands, there are advantages and disadvantages associated with each. Systems operating at higher frequency ranges typically have faster data transfer rates and longer read ranges, and thus are desirable for many applications.

LF systems cover frequencies from 30 KHz to 300 KHz, although LF RFID systems typically operate at 125 KHz or 134 KHz. HF systems cover frequencies from 3 MHz to 30 MHz, although most HF RFID systems operate at 13.56 MHz. Finally, UHF systems cover frequencies from 300 MHz to 3 GHz, although UHF RFID systems typically operate between 860 MHz and 960 MHz. Different countries throughout the world have allotted different parts of the radio spectrum for RFID uses and have generally standardized uses in LF and HF systems, although a standardized area of the UHF spectrum has not been agreed upon. Thus, UHF systems in Europe typically operate between 865 MHz to 868 MHz, UHF RFID systems in North America typically operate between 902 MHz and 928 MHz, and UHF systems in China have been approved to operate between 840.25 MHz and 844.75 MHz as well as 920.25 MHz and 924.75 MHz. While different tags are required for RFID uses in each of the three main RF bands (LF, HF, UHF), the differing frequency bands used throughout the world for UHF RFID systems also require slightly different tag designs, typically achieved by modifying the tag antenna, to function in each region.

The major components of a passive UHF RFID tag include a radiated power source from a UHF RFID reader, a conducting antenna, a matching loop, and a UHF RFID integrated circuit or chip, such as a UHF RFID Gent integrated circuit. Passive UHF RFID tags collect power radiated from the RFID reader and transfer the collected power to the integrated circuit via a matching loop circuit to turn the integrated circuit on. Once the integrated circuit has been powered on, it can perform the required protocol commends, such as the required Gen2 protocol commands for a Gen2 integrated circuit.

Chip manufacturers provide a standard impedance value at the front end of the integrated circuits. In addition, the new integrated circuits incorporate a self-adjusting tuning circuit to provide a limited range of capacitance to find the best impedance across the limited range to absorb as much radiated power as it can within the given capacitance range. While helpful in addressing slight changes in impedance due to the tag applications, the main benefit is increasing the sensitivity of the tag. For example, tag sensitivity may be increased by approximately 1 dB to approximately 2 dB. Such self-adjusting circuits may also help the forward link, turn-on power of the tag. In addition, this small, limited range of capacitance can help to broaden the response of small, narrow-band RFID tags.

The antenna design further contains a matching loop to provide the needed inductance value to match to the integrated circuit. The loop circuit is essentially a single loop antenna element, such that the size of the loop is driven partly by the presented impedance of the integrated circuit and the desired tuning for the application established by the antenna designer. Particularly, the antenna design is established to fit into a specified size label. Label size is typically driven by the size of the product packaging and available space on the product packaging to place the label containing an RFID tag without covering up or otherwise obscuring printed content on the product packaging. Thus, an antenna designer typically starts with establishing the loop matching circuit, which takes up a certain percentage of the available label space. The antenna is tuned and matched to the product to which it will be attached in order to compensate for any potential influence the package material may have on the antenna, as well as balancing power transfer to the integrated circuit to achieve the desired read range by the application.

Passive UHF RFID continues to be adopted globally into many applications. In particular, the apparel market has been driving significant growth for more than ten years. As the technology becomes more ubiquitous, new applications continue to emerge. Reader manufacturers continue to evolve their hardware devices to enable new read points throughout the supply chain, as well as increase the readability of RFID tags. Chip manufacturers have continued to increase the sensitivity of their chips incrementally for each new iteration, which increases the read range of RFID tags. Antenna designers, such as Avery Dennison Retail Information Services, LLC, of Mentor, OH, continue to create new antenna designs to match the performance of the tag to the application environment.

While the form factors for the apparel market have fundamentally not changed over the past ten years, each new incremental performance increase from chip manufacturers and reader manufacturers has resulted in incremental improvements in the system performance of an RFID application. Such incremental improvements in system performance result in the increased system margin, advantageously making deployed systems more robust, but not necessarily enable new emerging applications.

The market for RFID technology, including passive UHF RFID, however, is moving into areas beyond apparel, such as, but not limited to, convenience stores, food applications, aviation, pharmaceuticals, and the like. These emerging applications pose a tremendous challenge for current RFID systems, however, because they require considerably smaller tags that must be read in high-density environments with a wide variation of product material influence. In addition, such tags must not be limited in use to particular geographic locations, but rather must work globally.

Accordingly, there is a need for an RFID tag that is small, can be used on or in connection with a wide range of materials, has a relatively long read range, and is not limited to use in a particular geographic region.

BRIEF SUMMARY OF THE INVENTION

This present disclosure relates to a UHF RFID tag architecture, generally comprising an antenna, a loop, a chip, and construction. The UHF RFID tag advantageously may address emerging applications having unique requirements that have been difficult to achieve in the past. For example, emerging markets that may be served by the UHF RFID tag of the present disclosure may require a tag having a small size, a strong read range, that must work across a broad range of material characteristics, and adapt globally to its environment.

According to some embodiments of the present disclosure, a passive radiofrequency identification ("RFID") tag comprises an antenna and an integrated circuit having a first total resistance and a second total resistance that is greater than the first total resistance, and the integrated circuit is configured to be selectably switched between the first total resistance and the second total resistance.

In some embodiments, the passive RFID tag comprises a first resistor and a second resistor. The first resistor and second resistor may be components of the integrated circuit. In some embodiments, the first total resistance is a function of a resistance of the first resistor and the second total resistance is a function of a resistance of the second resistor. In some embodiments, the first total resistance is a function of a total resistance of the first resistor and the second resistor when connected in parallel, and the second total resistance is a function of a resistance of the first resistor or a resistance of the second resistor. In other embodiments, the second total resistance is a function of a total resistance of the first resistor and the second resistor when connected in series, and the first total resistance is a function of a resistance of the first resistor or a resistance of the second resistor.

According to other embodiments, the passive RFID tag comprises a plurality of resistors, where the first total resistance is a function of a total resistance of two or more of the plurality of resistors when connected in parallel. In some embodiments, the second total resistance is a function of a resistance of one of the plurality of resistors. In other embodiments, the second total resistance is a function of a total resistance of two or more of the plurality of resistors when connected in series.

In other embodiments of the present disclosure, the passive RFID rag comprises a plurality of resistors, where the second total resistance is a function of a total resistance of two or more of the plurality of resistors when connected in series. In some embodiments, the first total resistance is a function of a resistance of one of the plurality of resistors. In other embodiments, the first total resistance is a function of a total resistance of two or more of the plurality of resistors when connected in parallel.

According to some embodiments, the integrated circuit of the passive RFID tag has a third total resistance and the integrated circuit is configured to be selectably switched between the first total resistance, the second total resistance, and the third total resistance. In some embodiments, the third total resistance is greater than one or both of the first total resistance and the second total resistance. In some embodiments, the third total resistance is less than one or both of the first total resistance and the second total resistance. In some embodiments, the third total resistance is greater than the first total resistance and less than the second total resistance.

According to some embodiments, the passive RFID tag comprises a radiofrequency ("RF") boost module. In some embodiments, the RF boost module comprises one or more capacitors. In some embodiments, the RF boost module comprises two or more capacitors connected in parallel.

According to other aspects of the present disclosure, a passive RFID tag comprises an antenna and an integrated circuit. The integrated circuit may have an RF boost module comprising one or more capacitors, and two or more resistors configured to selectably switch between a first total resistance and a second total resistance. In some embodiments, the RF boost module comprises two or more capacitors connected in parallel.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION OF THE INVENTION

The apparatuses and methods disclosed in this document are described in detail by way of examples and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to FIGURES.

It will thus be seen according to the present invention that highly advantageous UHF RFID tags and systems have been provided. While the invention has been described in connection with what is presently considered to be the most practical and preferred embodiments, it will be apparent to those of ordinary skill in the art that the invention is not to be limited to the disclosed embodiments, and that many modifications and equivalent arrangements may be made thereof within the scope of the invention, which scope is to be accorded the broadest interpretation of the appended claims so as to encompass all equivalent structures and products.

As noted above, passive RFID tags receive power from a radiating RFID reader. Specifically, the RFID tag antenna collects power from the RFID reader and transfers the power through a matching circuit (i.e., a matching loop) to the integrated circuit. As also discussed above, the integrated circuit contains an auto-adjusting capacitance across a limited range in order to power the chip.

Figure 1A:
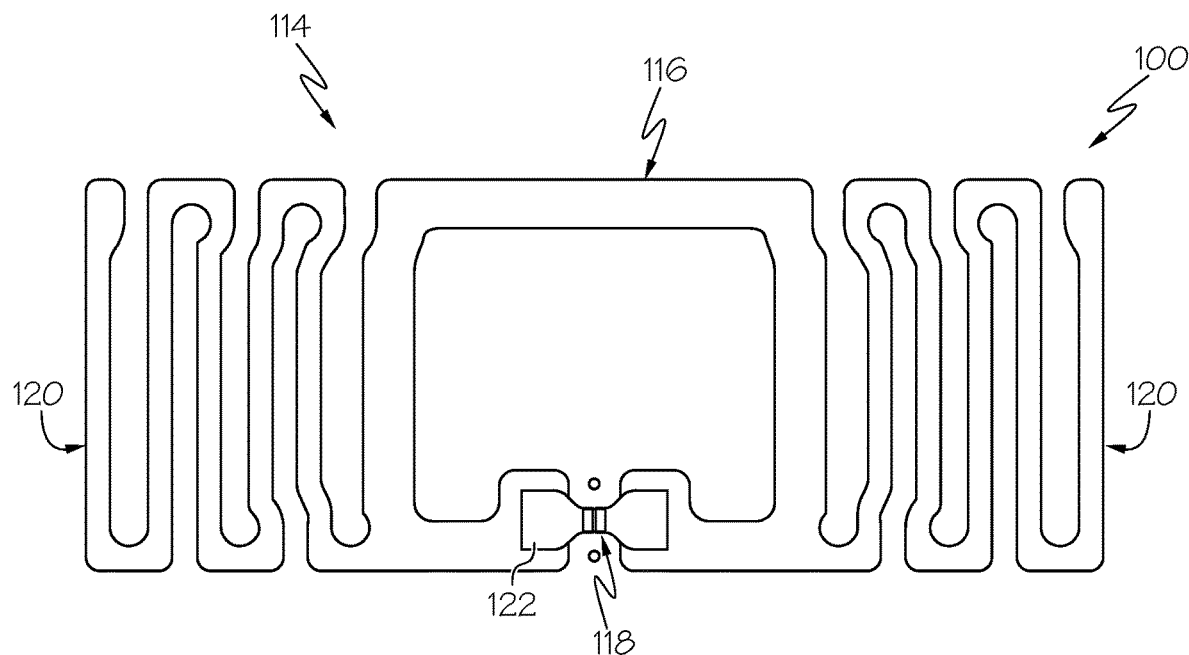
FIG. 1A depicts a passive RFID tag as known in the prior art.
Figure 1B:
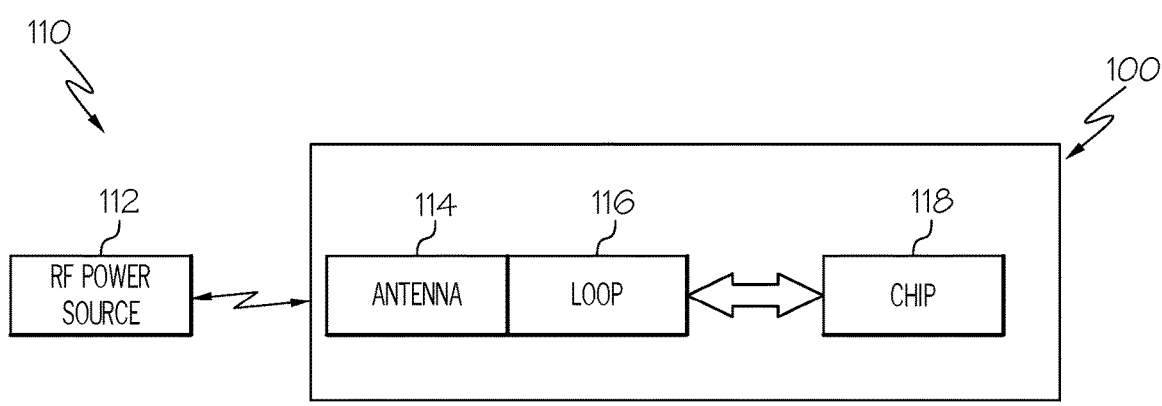
FIG. 1B depicts the main components for a passive RFID tag, such as the tag depicted in FIG. 1A.

With references to FIGS. 1A and 1B, an exemplary passive RFID tag 100 as known in the art is shown. In particular, FIG. 1B illustrates a block diagram showing the main components used with a system 110 for reading RFID tag 100. For example, system 110 includes the RF power source 112, which is typically provided by an RFID reader (not shown). RF power source 112 is used to power RFID tag 100, which typically includes tag antenna 114, such as a dipole antenna comprising radiating parts or dipole arms 120, as shown, matching loop antenna 116 (also referred to herein as simply as "matching loop"), and integrated circuit or RFID chip 118. As shown in FIG. 1A, RFID tag 100 may also include an interposer, such as an RFID strap 122, which is used to connect integrated circuit 118 to matching circuit 116. In other embodiments, integrated circuit 118 may be connected directly to matching circuit 116.

As discussed above, matching loop 116 is connected to the integrated circuit 118 either directly or indirectly with an interposer such as an RFID strap 122 to provide inductance needed to couple the integrated circuit 118 to tag antenna 114. Specifically, matching loop 116 is used to provide an impedance match between tag antenna 114 and integrated circuit 118. A person of ordinary skill in the art will understand that the input impedance of tag antenna 114 can be adjusted by changing the size of matching loop 116. Thus, an antenna designer must take into account the impedance of the selected integrated circuit 118 for a given application when designing tag antenna 114 to ensure that matching loop 116 is sized to provide a matching load antenna impedance. As shown in FIG. 1A, a portion of matching loop 116 may overlap with tag antenna 114 to provide greater coupling. While such a configuration can decrease the overall footprint of RFID tag 110 and increase efficiency in power transfer, it may lead to a narrower band tag. Alternatively, matching loop 116 may be spaced apart from tag antenna 114 (not illustrated).

As discussed above, new market applications for RFID technology has led the market to demand increasingly challenging features and characteristics, such as: smaller RFID tag sizes; RFID tags having stronger/longer read ranges for use with existing RFID hardware; RFID tags capable of coping with a wide range of material influence from the product, such as use on metal or on products containing liquid; and RFID tags configured to work globally. Because RFID tags in the prior art may not be capable of addressing one or more of these requirements, these challenges must be overcome with a new type of passive RFID tag architecture.

Many emerging applications require tags of increasingly smaller sizes. As one example, products sold in convenience stores frequently require small tags. Such products may include, but are not limited to health and medicine items, personal care items, beauty items, skin care items, and other items that are typically sold in small packages that may have extensive product labeling that cannot be obscured by a large RFID tag. For example, RFID tags used on beauty items must be small enough to be placed on items having minimal surface area, such as small tubes of, e.g., lipstick, lip gloss, lip stain, mascara, etc., and pencil or pencil-like items such as eyeliners, eyebrow pencils, lip liners, etc.

As RFID tags become smaller in length and/or width, the surface area of such tags decreases. As a result, the size of a matching loop capable of matching the impedance of the integrated circuit with the load antenna impedance in order to inductively couple the integrated circuit with the tag antenna will take up a relatively higher percentage of the available surface area of the tag. As market applications require smaller and smaller tags, the matching loop size required in a given application therefore can hinder antenna designers from adding more dipole length to the tag antenna in order to optimize other characteristics of the RFID tag. For example, a reduction in antenna size can mean less potential gain and bandwidth.

To overcome any deleterious effects of reducing tag size, the inductance value of the matching loop can be moved into the front end impedance of the integrated circuit in some embodiments. As a result, the size of the matching loop needed to match the integrated circuit impedance with the tag antenna impedance can be decreased. In some embodiments, moving the inductance value into the front end impedance of the integrated circuit eliminates the need for including a matching loop. Thus, by decreasing the size of or eliminating the matching loop, a larger surface area over which the tag antenna may be designed is provided.

Figure 2:
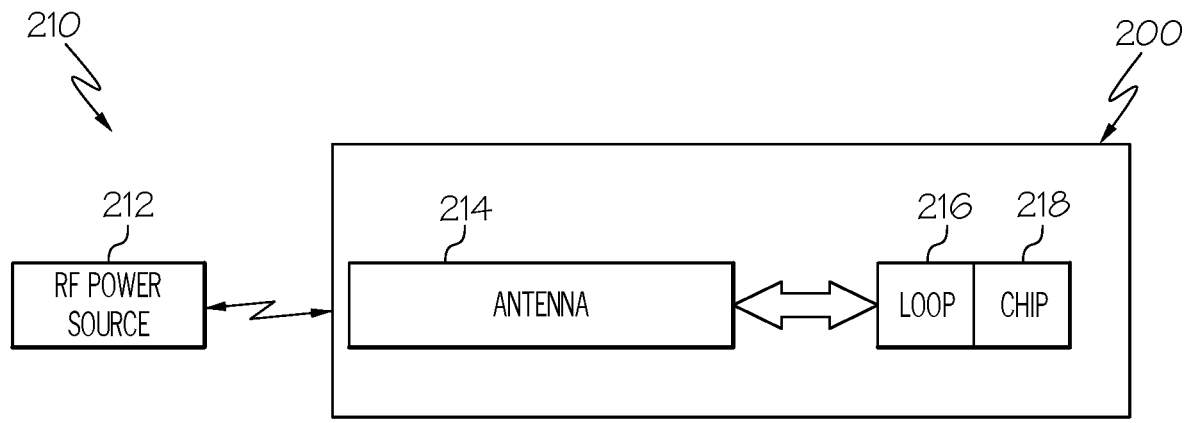
FIG. 2 depicts components of an RFID system according to certain aspects of the present invention.

With reference to FIG. 2, the main components of a RFID system 210 configured to read a RFID tag 200 optimized to increase the size of tag antenna 214 for a given tag size is shown. System 210 may include RF power source 212, antenna 214, matching loop 216, and integrated circuit 218. As discussed above, the inductance value has been moved from the tag antenna 214 to the integrated circuit 218. Thus, integrated circuit 218 can be attached to a matching loop 216 having a decreased size, while impedance value of integrated circuit 218 can still match that of tag antenna 214.

An additional challenge associated with decreasing the size of an RFID tag is that it may also reduce tag antenna aperture. A person of ordinary skill in the art will understand, however, that if the tag antenna is less effective at receiving power, then the amount of energy reflected by the tag antenna on the return link will also be reduced. As the reflected energy decreases, the effective read range of the RFID tag will also decrease. Successful reading with RFID reader hardware therefore will depend on the ability of the hardware to detect the weak signals from the RFID tag. Thus, RFID readers with greater sensitivity must be provided, typically at a greater cost.

To address this issue, the proposed architecture according to some embodiments of the present disclosure adds a capacitance boost within the integrated circuit itself. The capacitance boost can provide an increased charge pump to the integrated circuit, which in turn can boost the return signal to the RFID reader hardware. Advantageously, this can provide an increased signal to the RFID reader to provide increased read range, add system margin in the application, and help enable the readability of the RFID tag population, without requiring an RFID reader having a greater sensitivity.

Figure 3:
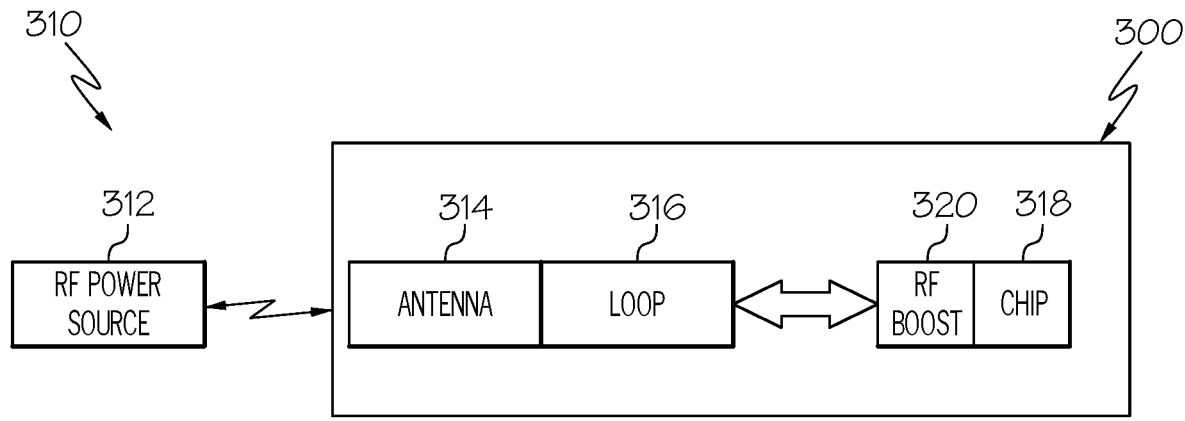
FIG. 3 depicts components of an RFID system according to certain aspects of the present invention.

As shown in FIG. 3, for example, an improved energy harvesting integrated circuit 318 is created by providing an RF boost module 320 with the integrated circuit 318. As discussed above, RF boost module 320 may comprise one or more capacitors (not shown). In some embodiments, RF boost module 320 comprises two or more capacitors connected in parallel. The one or more capacitors may be connected to integrated circuit 318 to store energy collected from, for example, an RF power source 312, and configured to provide energy to integrated circuit 318 for boosting a return signal to the RFID reader (not shown). As illustrated in FIG. 3A, matching loop 316 is provided with the tag antenna 314, and RF power source 312 is a component of RFID reader.

As discussed above, one disadvantage associated with decreasing the size of an RFID tag is that it can reduce the tag antenna aperture. When the tag antenna aperture decreases, however, the tag antenna will receive less energy from the RF power radiated from the RFID reader. Accordingly, some embodiments of the present invention address this problem by moving the inductance value of the matching loop into the front end impedance of the integrated circuit to maintain available surface area for tag antenna, as discussed above, and by adding energy harvesting capabilities, for example with a capacitance boost as discussed above, within the integrated circuit itself. Thus, the integrated circuit can provide increased sensitivity and be able to turn on at lower incident power for a given radiated RF power from the RFID reader.

Figure 4:
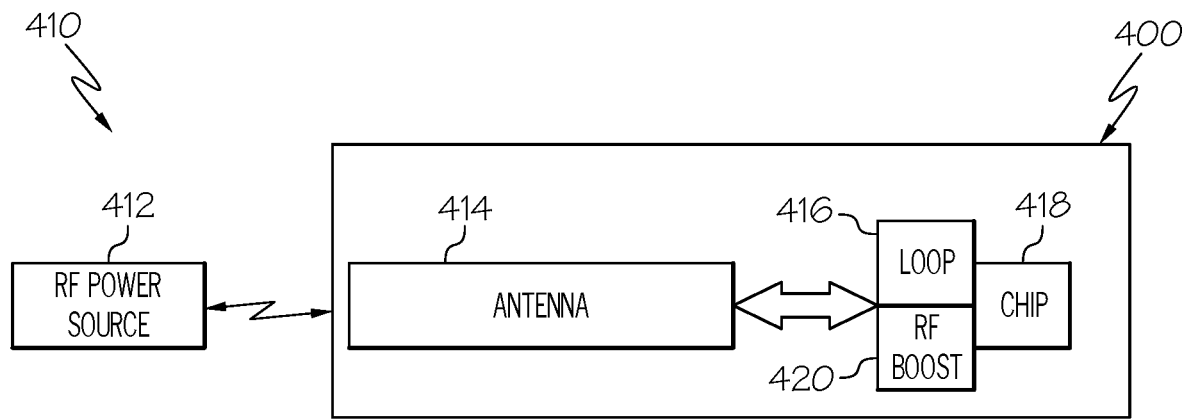
FIG. 4 depicts components of an RFID system according to certain aspects of the present invention.

With reference to FIG. 4, one embodiment of the present disclosure shows an RFID system 410 for use with an RFID tag 400 having a combination of features disclosed herein to provide increased read range and sensitivity. As shown, by moving the inductance value from tag antenna 414 to integrated circuit 218, a smaller matching loop 416 can provide the needed impedance to match that of tag antenna 414. As a result, size of tag antenna 414 can be increased to provide increased RF range. In addition, while the power source for integrated circuit 418 is provided by RF power source 412, a RF boost module 420 is provided along with integrated circuit 418. As discussed above, RF boost module 420 may comprise one or more capacitors (not shown), such as one or more capacitors connected in parallel. The one or more capacitors may be connected to integrated circuit 418 to store energy collected from, for example, RF power source 412, and configured to provide energy to integrated circuit 418 for boosting a return signal to the RFID reader (not shown).

In addition to the disadvantages noted above, a smaller tag antenna aperture will inherently become narrow-band. An RFID tag incorporating such a tag antenna may therefore be restricted to a particular geographic region or area. Thus, RFID tags operating in the US, the UK, and China and/or Japan may each require a unique antenna design to operate in the stated geographic region. While this may not be a problem if an RFID tag is to be deployed in one specific region only, for international applications this will result in increased stock keeping units (SKUs) for RFID converters and their customers to have to manage in their supply chain. For example, brands and retailers that sell products internationally would need a different RFID tag for a given product sold in the US and for the same product sold in Europe. This requirement decreases efficiency in the supply chain and increases costs that may ultimately be passed on to consumers.

To address this problem, some embodiments of the present disclosure have a switchable or variable impedance within the integrated circuit. By providing a switchable impedance, a step change from one geographic frequency band to another can be created. According to some embodiments, the step change is operated with an RF command from the RFID reader. For example, when a RFID tag is to be deployed in a particular geographic region, a printer or other method of applying the RFID tag to a product can be set to the particular geographic region via an RF command at its initial point in the supply chain. As the product moves through the supply chain, if it is to be shipped to the next step in the supply chain to a region of different operating RFID reader frequency, the RFID tag can be inventoried and a "Geographic Select" command can switch the tag to the proper impedance to provide the operating frequency for the region where the product with the RFID tag will deployed. A "Geographic Select" command can thus improve performance of the RFID tag by optimizing it for the new geographic region.

According to some embodiments, an RFID chip or integrated circuit may be provided with the ability to change impedance matching strategy depending on either a preset condition or an adaptive condition. In general, two impedance matching strategies can be used between an integrated circuit and a tag antenna. For example, a relatively broadband power match to integrated circuit resistance, $R_p$, and integrated circuit capacitance, $C_p$, can allow a tag to operate over the full operating frequency range of an RFID reader. As discussed further below, such a tag may operate over either a continuous frequency range or two distinct frequency bands. Typically, the operating range of the RFID reader is associated with a particularly geographic region, as discussed above, as well as other factors, such as co-location with an interfering source. Alternatively, a relatively narrow band match may be provided where the reactive component of the antenna impedance is designed to resonate with the integrated circuit input capacitance. Thus, a high integrated circuit resistance, $R_p$, will have a high Q value and the maximum possible voltage on the integrated circuit.

RFID chips generally contain a structure designed to multiply the incoming alternating current ("AC") voltage from an RF power source prior to its conversion to a direct current ("DC") voltage to power the integrated circuit. These voltage multipliers may contain switches, such as diodes or transistors, and may have a minimum operating voltage. A higher input voltage therefore can be advantageous to give a lower operating threshold. The input impedance of an integrated circuit can be a function of energy loss in items such as electrostatic discharge diodes and the power taken by the integrated circuit to charge an internal capacitor to allow the RFID tag to operate.

Typically, a high integrated circuit resistance, $R_p$, which results in a greater input impedance, is associated with a narrow bandwidth and a resonant match, and a limited charging rate of an internal capacitor. Because a tag having a high $R_p$, for example, typically cannot accept power over a number of frequencies in a band associated with frequency hopping, it may only be able to work at one frequency or a very narrow range of frequencies. Therefore, before the tag can begin to rectify power received from an RF power source, the tag must wait for the RF reader system to transmit at the correct frequency. Moreover, because tags having a high $R_p$ result in a slower charging of internal capacitors, such tags may need multiple charging events, which in turn reduces the response speed of the tag. A high input impedance, however, allows an amplifier circuit to provide a good amplification of the input signal. In contrast, a lower $R_p$, which results in a lower input impedance, typically is associated with broader band conjugate impedance power matching, allowing such tags to operate with an RFID reader system capable of periodically changing frequency (frequency hopping), and faster charging of the internal capacitor. Such features can advantageously provide integrated circuit, and thus RFID tag, with a faster response speed.

Figure 5:
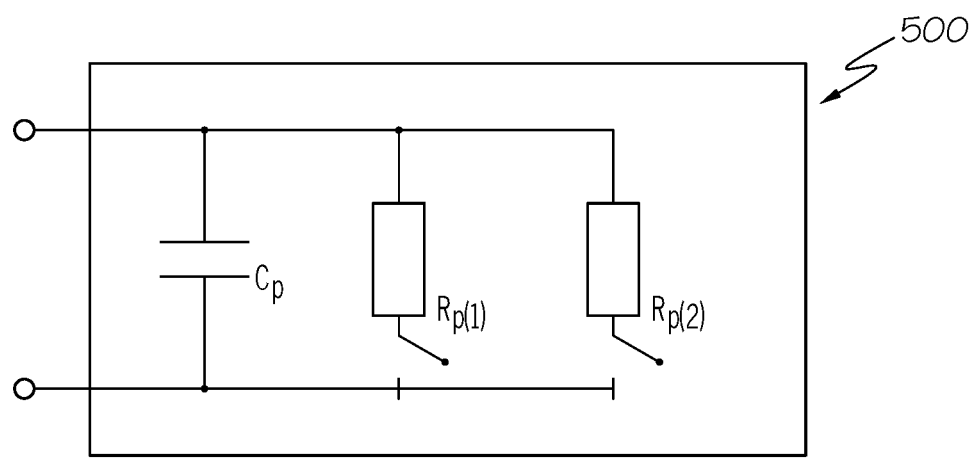
FIG. 5 depicts an integrated circuit according to certain aspects of the present invention.

With reference to FIG. 5, an integrated circuit 500 for an RFID tag can have a constant capacitance, $C_p$, and a switchable resistance, $R_p$, thus providing a switchable input impedance. For example, integrated circuit 500 can switch between a first input impedance and a second input impedance, where the second input impedance is greater than the first input impedance. By providing an integrated circuit that can switch between a relatively low first input impedance, and a relatively high second input impedance, advantages associated with both a low input impedance and a high input impedance may be obtained by some embodiments of the present disclosure. In particular, a relatively low first input impedance can allow an integrated circuit to match a broader range of frequencies from an RFID reader and provide a faster charging rate of internal capacitors, while a relatively high second input impedance can provide the integrated circuit with improved amplification of an input signal.

With continued reference to FIG. 5, in some embodiments, first input resistance may be provided by providing a first total resistance, $R_{pm}$, to integrated circuit 500, and second input impedance may be provided by providing a second total resistance, $R_{p(2)}$, to integrated circuit 500. To ensure that second input impedance is greater than first input impedance, second total resistance, $R_{p(2)}$, may be greater than first total resistance, $R_{p(2)}$. A person of ordinary skill in the art will understand that variable total resistances can be achieved in any number of ways. For example, $R_{p(1)}$ may be a single, first resistor having a lower resistance than $R_{p(2)}$, a single, second resistor. Alternatively, $R_{p(2)}$ can be provided by two or more resistors connected in parallel to provide a first total resistance that is less than that of second total resistance, where second total resistance, $R_{p(2)}$, may be provided by any one of the two or more resistors individually or a subset thereof connected in a manner that provides a greater second total resistance than $R_{p(1)}$. In some embodiments, $R_{p(2)}$ can be provided by two or more resistors connected in series to provide a second total resistance that is greater than that of first total resistance, where first total resistance, $R_{p(1)}$, may be provided by any one of the two or more resistors individually or a subset thereof connected in a manner that provides a lower first total resistance.

In some embodiments, integrated circuit 500 may be configured to provide additional total resistances, such as third total resistance, etc., to enable integrated circuit 500 to switch to, e.g., a third input impedance. In some embodiments, a third total resistance may be greater than first total resistance and/or greater than second total resistance. In other embodiments, a third total resistance may be less than the first total resistance and/or less than the second total resistance. In still further embodiments, a third total resistance may be greater than first total resistance, but less than second total resistance.

In some embodiments, integrated circuit 500 having switchable input impedances, created by, for example, providing switchable total resistances, can be used in RFID tags where power harvesting, as discussed elsewhere herein, is desirable. For example, integrated circuit 500 having a switchable input impedance can be used as, or in connection with, an RF boost module 320, 420, as discussed further elsewhere herein.

Figure 6A:
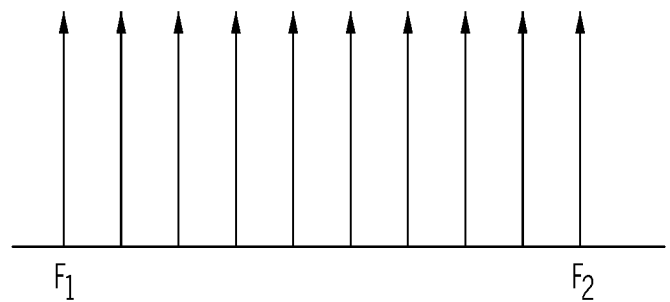
FIG. 6A and FIG. 6B depict alternate bands of frequency occupancy.
Figure 6B:
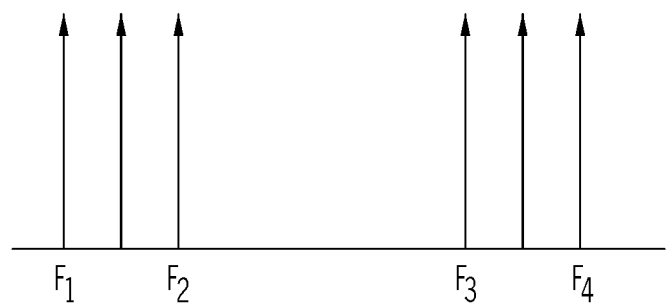

With reference to FIGS. 6A and 6B, two types of band occupancy are shown. For example, 6A illustrates a continuous frequency band F1 to F2, while FIG. 6B illustrates two discrete frequency bands, F1 to F2 and F3 to F4. A RFID reader configured to operate over a continuous frequency band, such as the band illustrated in FIG. 6A, is capable of hopping between different frequencies in that band. A RFID reader configured to operate in different sub-bands, such as those shown in FIG. 6B, is capable of hoping between different frequencies in both bands, F1 to F2 and F3 to F4, and also periodically changing between the sub-bands.

Figure 7A:
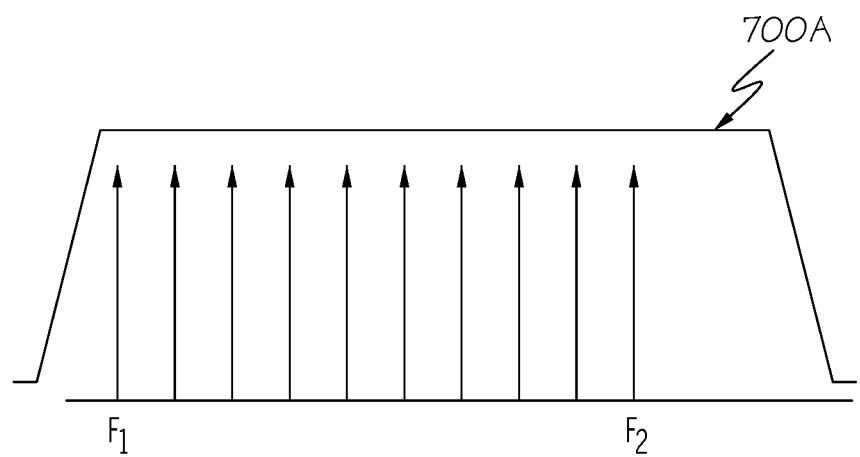
FIG. 7A and FIG. 7B depict operation of an RFID tag having broad-band matching capabilities according to certain aspects of the present invention.
Figure 7B:
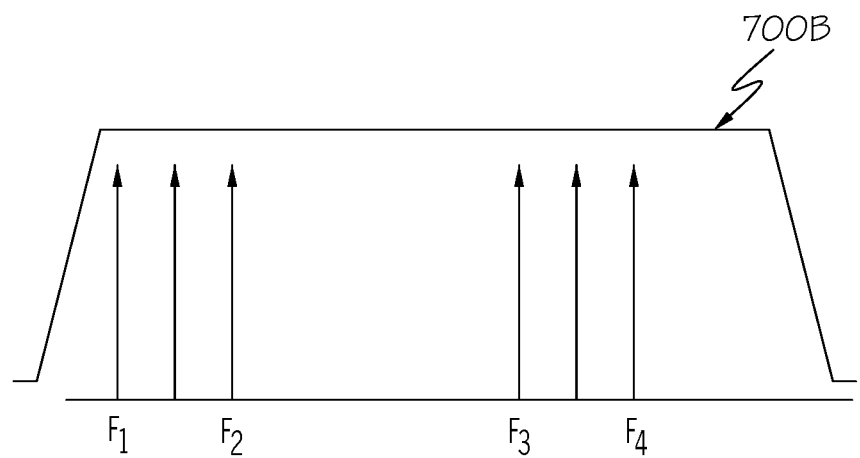

FIGS. 7A and 7B illustrate how an RFID tag having a low input impedance, and thus broad-band matching capabilities, may operate. For example, a tag with a low input impedance may operate, as indicated by the lines labeled 700A and 700B, with wither F1 to F2, or both F1 to F2 and F3 to F4 inside its range. Advantageously, RFID tags with low input impedances may therefore give a faster response to an RFID reader system. Moreover, such tags may provide matching at frequencies outside of either F1 to F2 or F1 to F4 to allow for product related shifts.

Figure 8A:
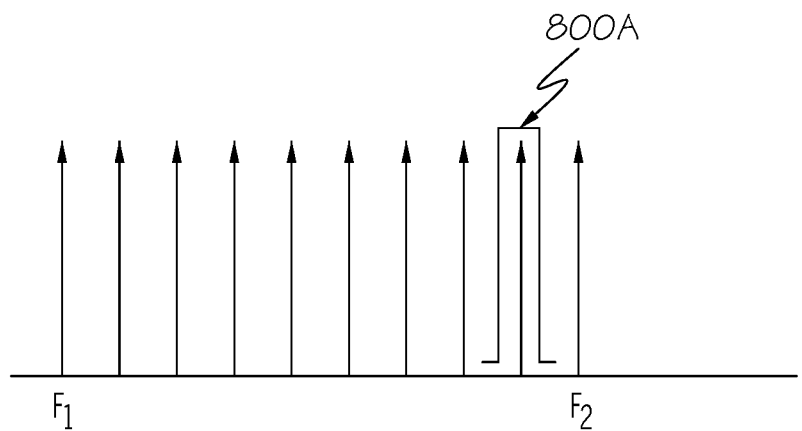
FIG. 8A and FIG. 8B depict operation of an RFID rag having narrow-band matching capabilities according to certain aspects of the present invention.
Figure 8B:
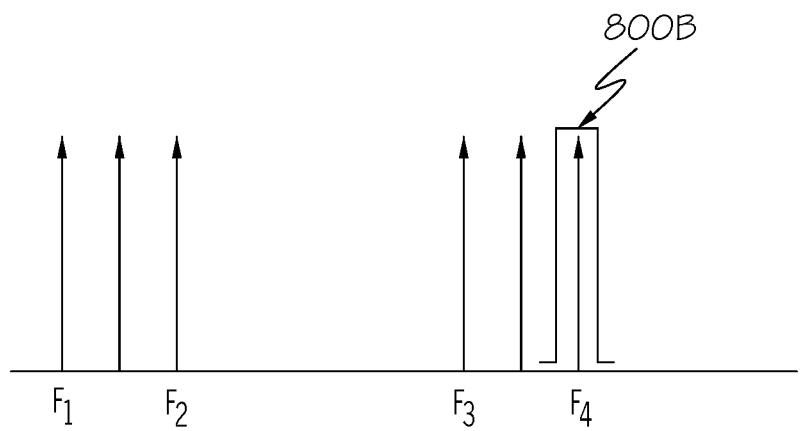

In contrast, FIGS. 8A and 8B illustrate how an RFID tag having a high input impedance provides narrow band matching, as indicated by the lines labeled 800A and 800B. As shown in FIG. 8A, tag bandwidth is therefore less than the full range of F1 to F2. Similarly, as shown in FIG. 8B, tag bandwidth operates only in the F3 to F4 sub-band at less than the full range thereof, and therefore will not operate when the reader is in the F1 to F2 band.

The choice of optimum setting for an RFID tag can change depending on various input parameters or stored values in memory. For example, an RFID tag may be pre-programmed to operate initially in resonant mode. In one example, the pitch of one or more antennas and mode in a RFID printer system can affect the chosen mode. For a printer that stops to print and program an RFID tag, a resonant matching condition may be used. In some embodiments, the first frequency selected may be the expected operating frequency for the RFID tag, in order to provide optimum communications between RFID printer system and RFID tag. The RFID reader of RFID printer system may then hop to other frequencies for a period of time. Although this may interrupt communications, the RFID tag may have moved out of the field of view of RFID printer system by this time. If adjacent tags are also in a resonant matching condition, a simple de-tuning material can reduce the performance of the adjacent tags significantly, as their performance drops rapidly with loading in a narrow band condition.

In another example, the resonant mode can be used as part of an in-line test system. In such a system, the system may operate in suppressed radiation conditions, and thus may not need to comply with local radiofrequency regulations. As a result, the RFID reader may be set to the peak response frequency of an RFID tag at the test position. Adjacent tags may be detuned by a dielectric or metallic material, and, as they are in resonant mode, their sensitivity drops significantly preventing them from reading at the same time as the RFID tag under test. After programming or testing, depending on the type of tag (for example, broad-band tags for items such as mixed apparel, or narrow-band tags for items such as cosmetics), the tag can be programmed to turn on or off the resonant mode.

The mode of operation may also be commanded as part of a reader command, where a test of a specific bit during a select operation can change the operating state. This can allow the RFID reader to have control. In some applications, an inventory may be performed first using the broad-band mode (low $R_p$), and the tags read in that condition can be locked into that state either by programming or by linking to a flag that indicates the tag has been successfully inventoried. Next, the inventory can be switched to resonant mode for the slower responding, but higher Q condition (high $R_p$). This may allow for higher performance under some conditions, and the capturing of residual tags. In this way a more successful overall inventory can be achieved in a minimum time. Specifically, the majority of tags can be captured in the broad-band, fast mode, while residual tags can be captured in the narrower-band, slower mode. According to some embodiments, this mode of operation can be achieved by utilizing tags with an integrated circuit that having a switchable input impedance, as discussed above.

Figure 9:
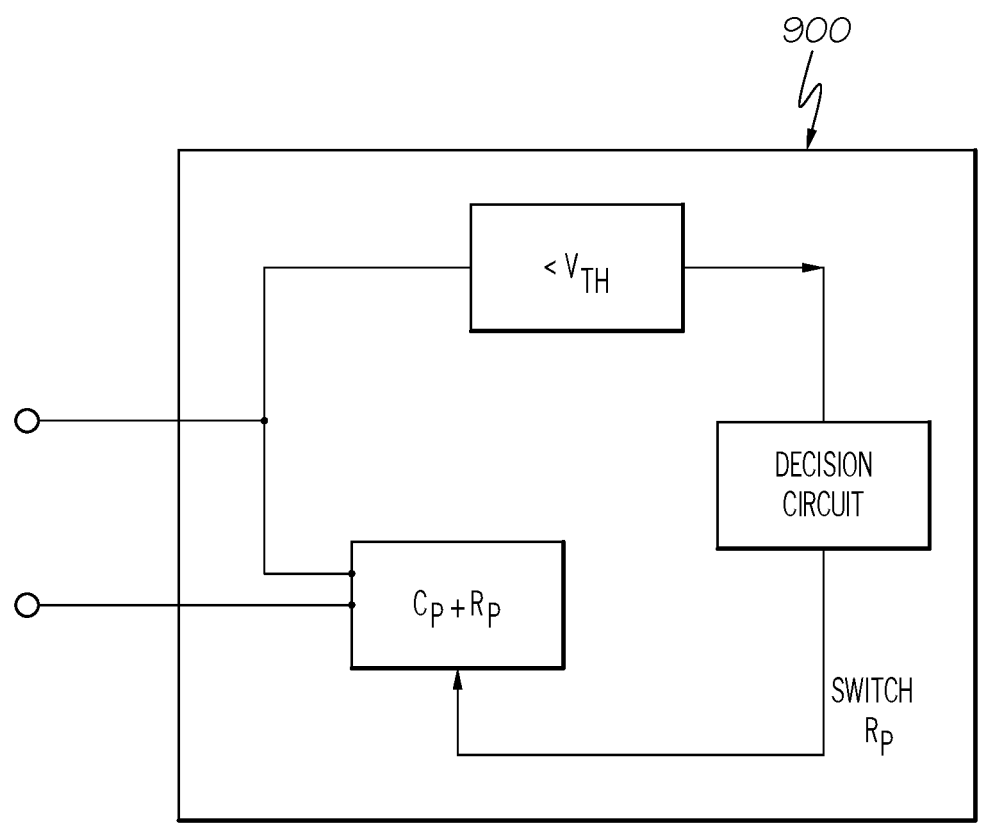
FIG. 9 depicts an integrated circuit according to certain aspects of the present invention.

As shown in FIG. 9, an integrated circuit may be capable of determining whether a resonant (high $R_p$) or broad-band (low $R_p$) match is relevant and/or desired. In some embodiments, integrated circuit 900 has a sub-threshold detector circuit capable of operating below the power level required to activate integrated circuit 900. For example, sub-threshold detector circuit may have a low complexity and work at a relatively low speed. As a RFID reader hops across a frequency band, the sub-threshold detector circuit may emit a series of pulses to switch the input between broad-band (low $R_p$) and resonant (high $R_p$) mode, and examine the result(s). If all of the pulses over a given time are of similar amplitude to those in resonant mode, the integrated circuit can select broad-band mode and the integrated circuit may be retained in that state for a period of time, for example, between 1 second and 10 seconds. According to other embodiments, the integrated circuit may be retained in a broad-band mode for more than 10 seconds, or less than 10 seconds. Advantageously, retaining integrated circuit in broad-band mode can give the same performance as resonant mode, but with faster communications. In some embodiments, if the peak in resonant mode is much higher than that in broad-band mode, integrated circuit 900 may select resonant mode and be maintained in this state for a period of time, as described above. For example, integrated circuit 900 may be maintained in resonant mode for less than 1 second, for 1 second to 10 seconds, or for more than 10 seconds. By electing resonant mode, integrated circuit may have slower communications but a higher probability of inventory when the overall power level rises to the tag operating threshold.

Thus, according to some embodiments, an integrated circuit with a low $R_p$, broad-band state and a high $R_p$, narrow-band selectable state, with either the same, modified two-state or adaptive mechanism, where the capacitance also may be changed to optimize performance, frequently described as auto-tune or auto-adjust, can be used to optimize performance for tags of different sizes and applications in inventory and other read conditions as well as inside RFID printers and in-line testers.

What is claimed is:

1. A passive ultra high frequency ("UHF") radiofrequency identification ("RFID") tag, comprising:
    a dipole antenna; and
    an integrated circuit having:
        a sub-threshold detector circuit configured to emit a series of pulses to switch an input between a broad-band mode and a resonant mode;
        a constant capacitance;
        a first total resistance; and
        a second total resistance that is greater than the first total resistance,
        wherein, the integrated circuit is configured to be selectably switched based in part on the series of pulses between the first total resistance and the second total resistance, and
        wherein the constant capacitance, the first and second total resistances are configured to change the impedance of the integrated circuit to match different UHF frequency bands.

2. The passive RFID tag of claim 1, further comprising a first resistor and a second resistor.

3. The passive RFID tag of claim 2, where the first total resistance is a function of a resistance of the first resistor and the second total resistance is a function of a resistance of the second resistor.

4. The passive RFID tag of claim 2, where the first total resistance is a function of a total resistance of the first resistor and the second resistor when connected in parallel, and the second total resistance is a function of a resistance of the first resistor or a resistance of the second resistor.

5. The passive RFID tag of claim 2, where the second total resistance is a function of a total resistance of the first resistor and the second resistor when connected in series, and the first total resistance is a function of a resistance of the first resistor or a resistance of the second resistor.

6. The passive RFID tag of claim 1, further comprising a plurality of resistors, where the first total resistance is a function of a total resistance of two or more of the plurality of resistors when connected in parallel.

7. The passive RFID tag of claim 6, where the second total resistance is a function of a resistance of one of the plurality of resistors.

8. The passive RFID tag of claim 6, where the second total resistance is a function of a total resistance of two or more of the plurality of resistors when connected in series.

9. The passive RFID tag of claim 1, further comprising a plurality of resistors, where the second total resistance is a function of a total resistance of two or more of the plurality of resistors when connected in series.

10. The passive RFID tag of claim 9, where the first total resistance is a function of a resistance of one of the plurality of resistors.

11. The passive RFID tag of claim 9, where the first total resistance is a function of a total resistance of two or more of the plurality of resistors when connected in parallel.

12. The passive RFID tag of claim 1, where the integrated circuit has a third total resistance and is configured to be selectably switched between the first total resistance, the second total resistance, and the third total resistance.

13. The passive RFID tag of claim 12, where the third total resistance is greater than one or both of the first total resistance and the second total resistance.

14. The passive RFID tag of claim 12, where the third total resistance is less than one or both of the first total resistance and the second total resistance.

15. The passive RFID tag of claim 12, where the third total resistance is greater than the first total resistance and less than the second total resistance.

16. The passive RFID tag of claim 1, further comprising a radiofrequency ("RF") boost module.

17. The passive RFID tag of claim 16, where the RF boost module comprises one or more capacitors.

18. The passive RFID tag of claim 16, where the RF boost module comprises two or more capacitors connected in parallel.

* * * * *